United States Patent Office 3,759,812
Patented Sept. 18, 1973

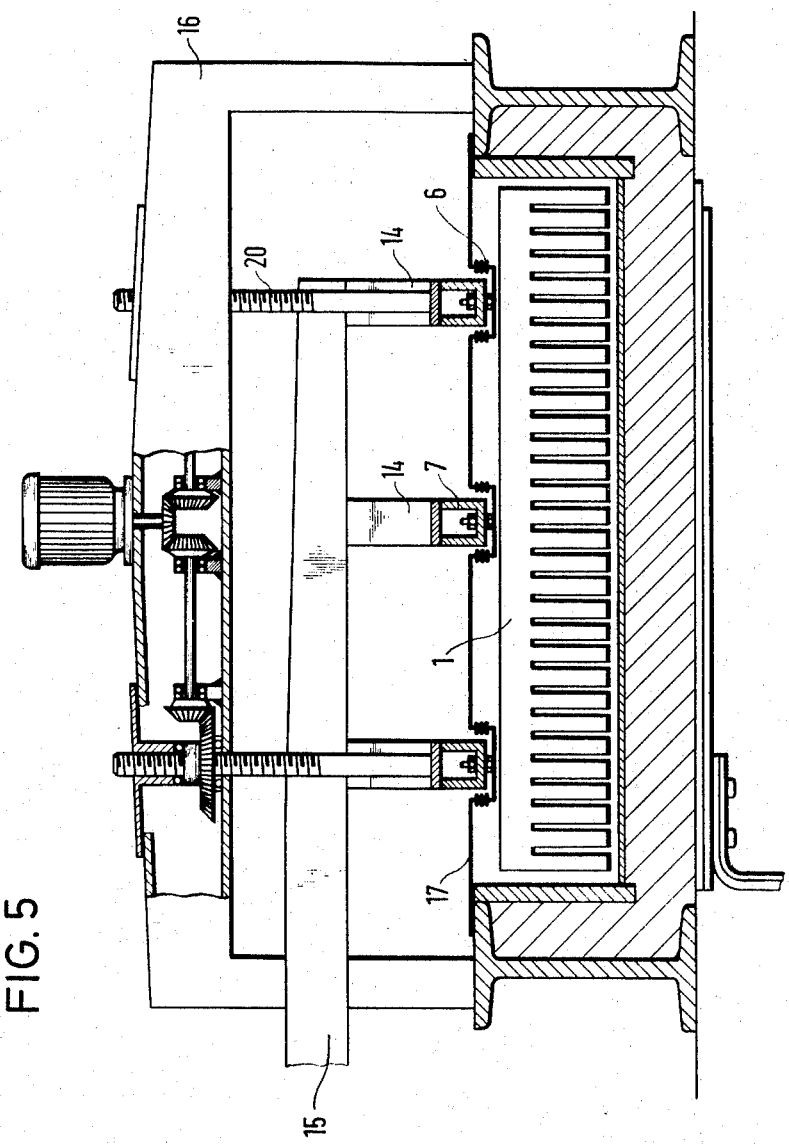

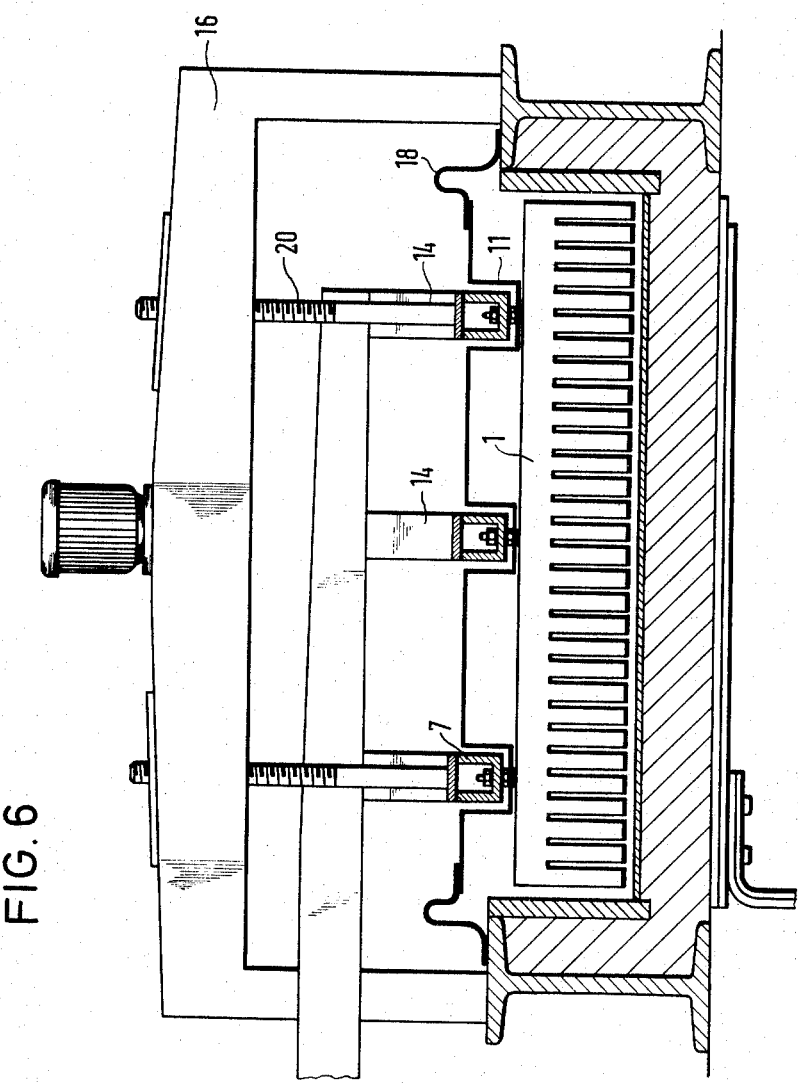

3,759,812
ANODE CONSTRUCTION FOR AMALGAM HIGH
LOAD CELLS
Konrad Koziol and Baptist Zenk, Rothenbach an-der
Pegnitz, Germany, assignors to C. Conradty, Nuremberg, Germany
Filed June 16, 1971, Ser. No. 153,636
Claims priority, application Germany, June 16, 1970,
P 20 29 640.6
Int. Cl. B01k 1/00, 3/08
U.S. Cl. 204—250
6 Claims

ABSTRACT OF THE DISCLOSURE

An anode structure, particularly for amalgam high load cells, in which the anode is made up of a plurality of graphite plates connected to current conducting rails by current conducting bolts which engage bushings in the upper edges of the graphite plates. The anode structure is receivable in a cell having a confining wall and a cell member engages the wall and extends over the anode and beneath the current conducting rails and engages the tops of the bushings so that only the graphite plates and bushings are exposed to the interior of the cell.

---

The present invention relates to an anode construction for amalgam high load cells. In horizontal mercury cells which to an ever increasing extent are employed in connection with the production of chlorine, the plate-shaped graphite anode which by means of the current conducting rod is connected to the cell cover has been widely adopted. Also the recently developed giant cells for from 250 to 500 ka. current intake and from 8 to 10 ka./m.$^2$ current intensity are based on the individual anode designed in the form of a stamp and composed of current feeding rod and graphite plate the rectangular or square base surface of which forms one of the wide sides of the plate, i.e. the anode surface proper. The number of anodes necessary for equipping such giant cell is naturally high inasmuch as the customary individual anode surface have an area of from 0.1 to 0.3 m.$^2$. The mostly nearly square individual anodes equipped with numerous longitudinal slots and gas discharge openings are arranged in rows of from five to eight anodes along lines parallel to the direction of flow of the mercury cathode.

The high state of development of the new giant cells which is reflected in the high current and energy exploits, in the servicing comfort and in the increased safety of operation of the electrolysis installations is due to a number of measures and improvements which concern to a certain extent also the stamp-shaped individual anode.

First the properties of the material of the graphite anodes have been considerably improved. While the resistance against anodic attack did increase, the specific graphite consumption was reduced in spite of a continuous intensification of the electrolysis process. An increase in the conductivity of the anode plates and rods assures low voltage drops, and the ever higher degree of purity of the electrographite, above all its freedom of vanadium, made possible a safe and economic operation of the amalgam electrolysis.

Then the construction of the individual anodes has been further improved. By employing ever thicker anode plates, the plate thickness has in the last thirty years been increased from 50 to 120 and 150 mm., the percentage-wise anode waste could be considerably reduced. The change-over from the rectangular to the square or nearly square anode shape improved the uniform current distribution. The installation of electrolyte copper cores in the paraffin impregnated graphite current feeding rods and the simultaneous improvement of the contact connection between rod and plate due to the introduction of new types of thread, which are better suited to the properties of the electrographite, resulted in a considerable reduction of the ohmic resistance. In view of the copper rods arranged directly in the graphite anode plates and filled in with soldering metal and equipped with a protective cover against the influence of the electrolyte and chlorine, as described for instance in German Auslegeschrift 1,082,237, it was possible further to reduce the voltage losses in the feeding line. The greatest saving in voltage is, however, due to the provision of numerous slots in the bottom side of the anode plates through which by means of bored holes the chlorine gas bubbles can quickly escape upwardly, and also due to the introduction of adjustable anode constructions. All of these measures and in particular also the better adaptation of the cross sectional dimensioning of the electrodes for the current supply, the shape of the anodes for an unimpeded as possible withdrawal of the chlorine gas bubbles and of the distance between the electrodes to the respective current intensity, and finally the mastering of the generated Joule's heat have brought about that the load on the cells could be increased by a multiple of the previously customary values without simultaneously increasing the energy requirement per ton of the produced chlorine.

Although horizontal amalgam high load cells equipped with stamp-shaped graphite anodes have now reached a high degree of of perfection with the result that the potassium chloride electrolysis belongs to those processes in connection with which the technical rationalization has been carried farthest, industry still endeavors to further improve the electrolysis process in order to make it still more intensive and more economical. The fact that these endeavors are justified is borne out by the ever increasing demand for low cost chlorine.

However, the customary stamp shape of the graphite anode by now seems to hinder a further increase in the current intensity. With very high current intensities ($D_A$ higher than 10 ka./m.$^2$) it becomes difficult sufficiently quickly to withdraw the produced chlorine gas from the bottom side of the horizontal anode plates in spite of the fact that the plates are provided with a great number of slotted gas withdrawal openings. Higher excessive voltages on the graphite and higher voltage losses in the electrolyte enriched with chlorine gas bubbles are the results. Moreover, with an increasing number of slots and gas withdrawal openings, the inner electric resistance, the graphite losses and the transport sensitivity of the anodes increase. Therefore, there exists a maximum loadability for the stamp-like graphite anode which should not be exceeded already in view of the increasing specific energy consumption. This limitation would be eliminated when the brine and the mercury would be passed through the anode-cathode gap at a higher speed as has previously been suggested. However, serious practical considerations oppose the construction of such cells so that although such suggestions have been known for quite some time, no technical cell of this type is yet in existence.

There has further been suggested a graphite anode construction which deviates from the customary stamp shape. This anode consists of a horizontal row of flat elements of graphite which are arranged perpendicularly with regard to the cathode of the cell and are spaced from each other in such a way that the escape of the anodic products of the electrolysis and the renewal of the electrolyte are favored. Each of these elements comprises a vertical row of thin graphite plates connected at their rims, which row is detachably mounted in such a way that, when the plate is partially worn on that side which is oppositely located with respect to the cathode, it is possible to extend the row by the addition of a new plate on that side which is opposite to the worn side, in other words, at the top, and the entire row can be displaced toward the cathode in order in this way to be able to completely use the worn plate. According to a preferred embodiment, the graphite plates which in rows are connected at their rims or margins are supported by graphite blocks which are also equipped with current supply terminals to which the plates are connected at both ends. The entire horizontal row of elements forms an entity in the interior of the cell, and the holding together of this entity is assured by pull rods which are not affected by the products of the electrolysis.

In addition to the complete use and exploitation of the graphite, this suggestion also aims at the protection of the surfaces of the elements not directly taking part in the electrolysis against corrosion. This is realized by covering the elements with a protective substance, especially polyvinylchloride or polyethylene. The protective substance employed on the anode plates is, however, of such a character that it detaches itself and disappears when it enters the electrolyte zone proper so that the active mass of the anode is exposed in conformity with the wear. As a substance suitable for this purpose, polyvinyl-chloride with pulverous graphite distributed therein is suggested.

One of the obvious drawbacks of this anode construction which aims at the saving in graphite and which has rendered the general introduction of such anode construction impossible, is seen in the entirely inexpedient electrical contact making and the way of connecting the individual graphite plates. The electrical contact making of a row of thin graphite anode plates in parallel arrangement by means of supporting blocks of graphite or metal pressed by pull rods against the plate ends can never function properly as experience has shown because the pressure at which the supporting blocks are pressed against the plate ends will differ at the individual plate ends. Due to those differences, different contact resistances are obtained and as a result thereof, a non-uniform current distribution and wear of the anodes. To this may be added that the supporting blocks and pull rods are located in the interior of the cells and are therefore continuously exposed to thermal and corrosive influences of the cell contents. The different thermal expansion of the different structural elements of the anode and the non-controllable changes in the dimensions of the graphite plates and graphite supporting blocks caused by swelling and corrosion are additional factors which impede a proper functioning of this particular anode construction. It may also be mentioned that all heretofore known and suggested protective substances and coatings on current conducting elements in the interior of the chlorine cells have proved to be unstable.

It is, therefore, an object of the present invention so to design an anode consisting of thin vertically arranged graphite plates that:

(a) The structural elements required for holding together the construction and for a uniform current distribution will be located outside the cell bath;

(b) The distance between the well conducting metallic current distributing rails and the graphite plates will be short and will be bridged by metallic current conductors which extend directly into the graphite plates;

(c) Each of the graphite plates has at least two feedings lines which are fed by separate current distributing rails;

(d) The subdivision of the anode into numerous groups of plates (elements) will be obviated;

(e) The type, shape, size, machining and arrangement of the graphite plates will meet the requirements concerning an unimpeded withdrawal of chlorine gas bubbles and will also meet the requirements concerning a low inner resistance; and (f) The overall structure will be simple and will meet the other requirements of an economical high load operation.

These and other objects and advantages of the invention will appear more clearly from the following specification in connection with the accompanying drawings, in which:

FIG. 5 is a cross section through an amalgam cell with rigid cover while employing an anode design according to the invention.

FIG. 6 is a cross section through an amalgam cell with floating cover while employing another anode design according to the invention.

The anode construction according to the present invention is characterized primarily in that the graphite plates are arranged transverse to the direction of flow of the mercury cathode and have a length corresponding to the width of the cathode while their bottom side is provided with comb-shaped slots and their top side has sunk-in contact bushings of anodically resistant material. The graphite plates have interposed therebetween trough-shaped bellows of corrosion resistant elastomers and are so connected to the current distributing rails that with the exception of the bushing-equipped graphite plates, all current conducting parts are outside the cells.

Figure 1:
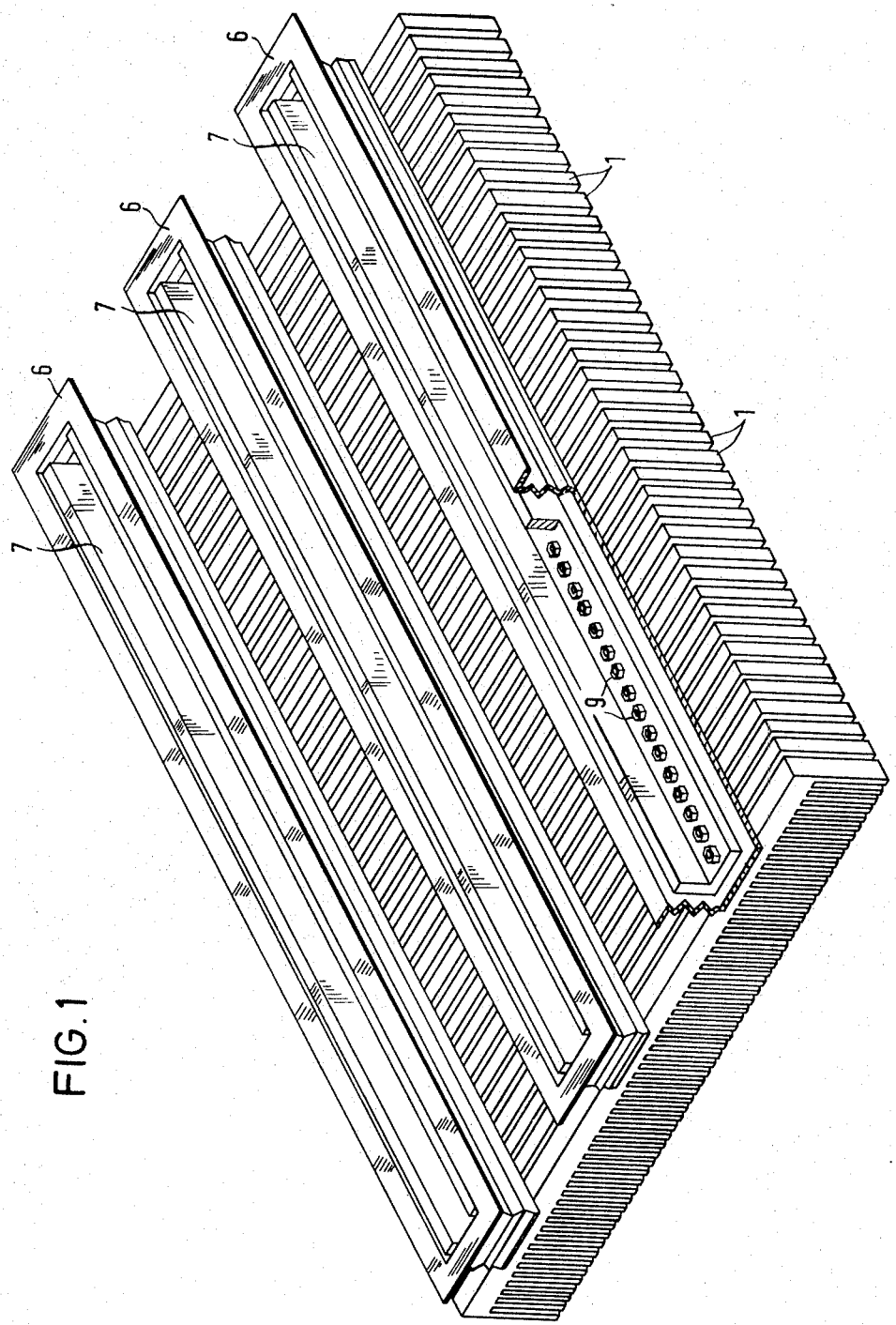
FIG. 1 is a top view of an anode, partially in section, according to the present invention which shows all essential elements of the construction with the exception of the contact bushing inserted in the graphic plates.

Referring now to the drawings in detail, the anode shown in FIG. 1 is composed of graphite plates 1 which are slotted in a comb-like manner which are arranged on edge in spaced relationship to each other. Each of the graphite plates is suspended on three U-shaped current distributing rails 7 which are preferably made of electrolyte copper and is connected thereto in the following manner: according to FIGS. 2–4, contact bushings 4 are firmly screwed onto the suspension points which consist of precious metal coated valve metal, for instance, platinum plated titanium. Connected to the inner thread of said contact bushings 4 are feeder or supply bolts 10, preferably of copper, which are additionally soldered to said thread. Current distributing rail 7 is connected to the free end of said bolts as shown in the drawing.

Figure 2:
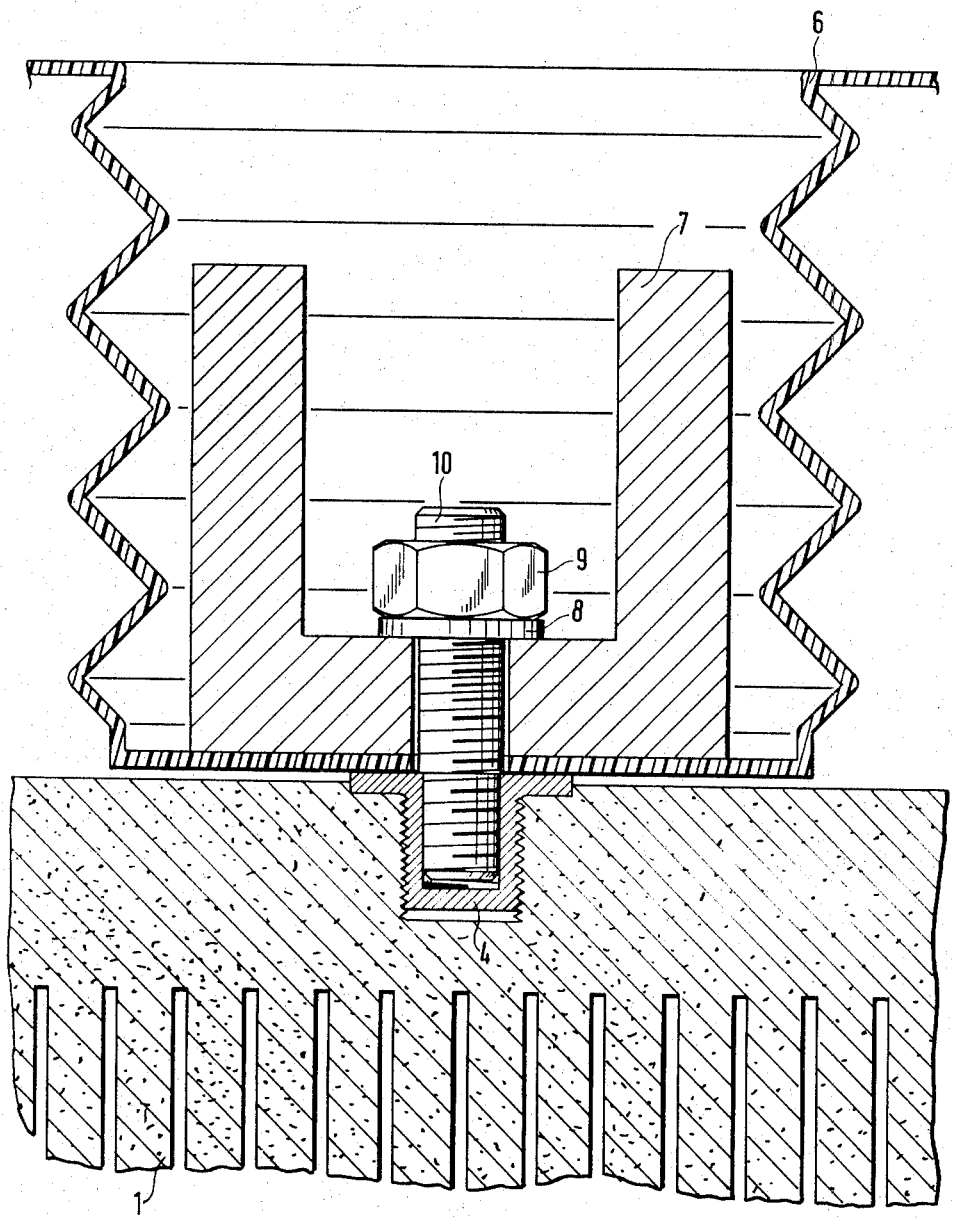
FIG. 2 is a vertical section through one of the connections of a graphite plate according to the invention with a current distributing rail.
Figure 3:
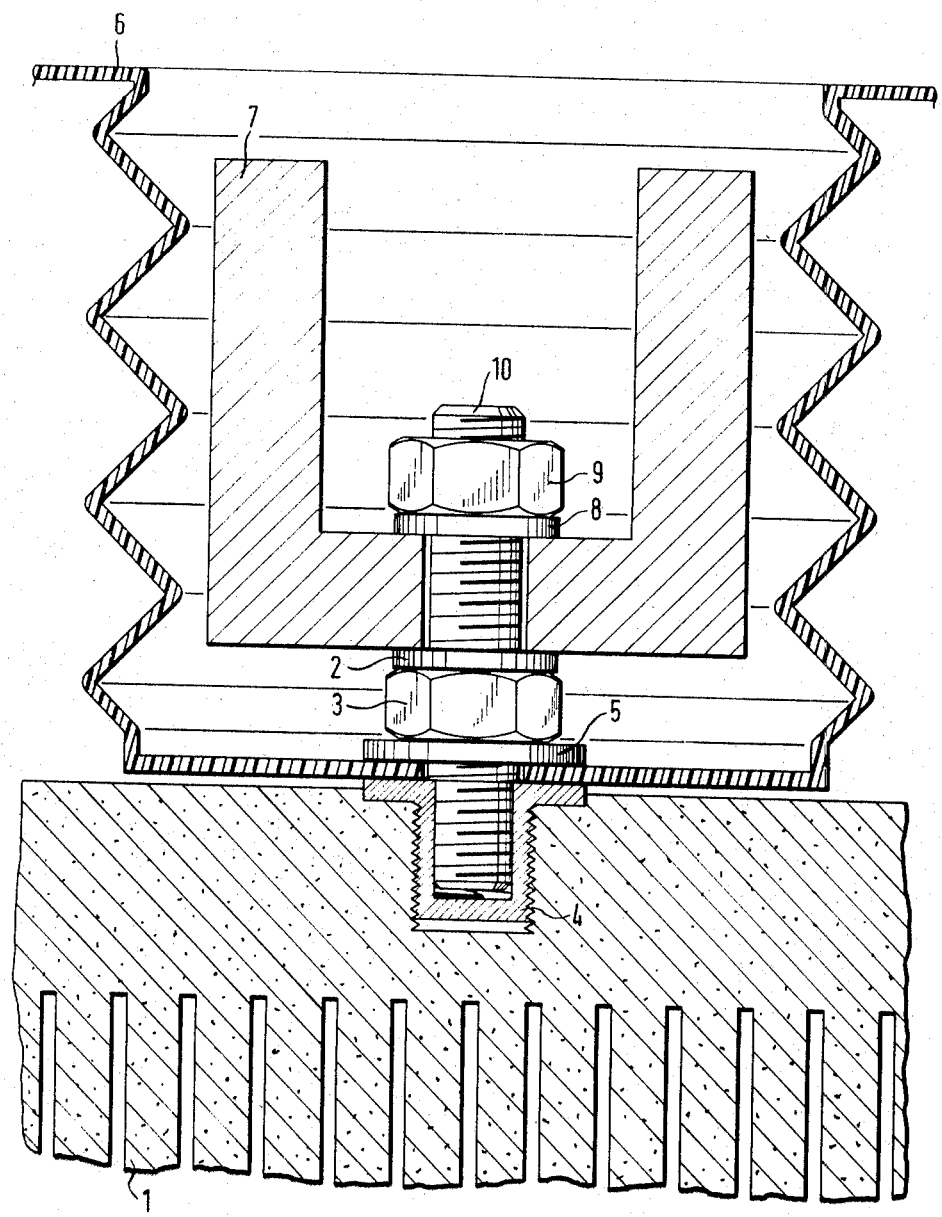
FIG. 3 is a vertical section through another connection of a graphite plate according to the invention with a current distributing rail.

According to FIG. 2, the flat bottom of the trough-shaped bellows of corrosion-resistant elastomer 6 is located between the collar of the contact bushing 4 and the bottom side of the current distributing rail 7. When the rail is tightened by means of nut 9, a sealing ring forms above the collar of the contact bushing. According to FIG. 3, first the bottom of the trough-shaped bellows is, by means of disc 5 and nut 3, screwed against the collar of the contact bushing 4. The current distributing rail 7 is, in this instance, similar to the arrangement of FIG. 2 secured to the feeder bolt by means of washer 8 and nut 9.

Figure 4:
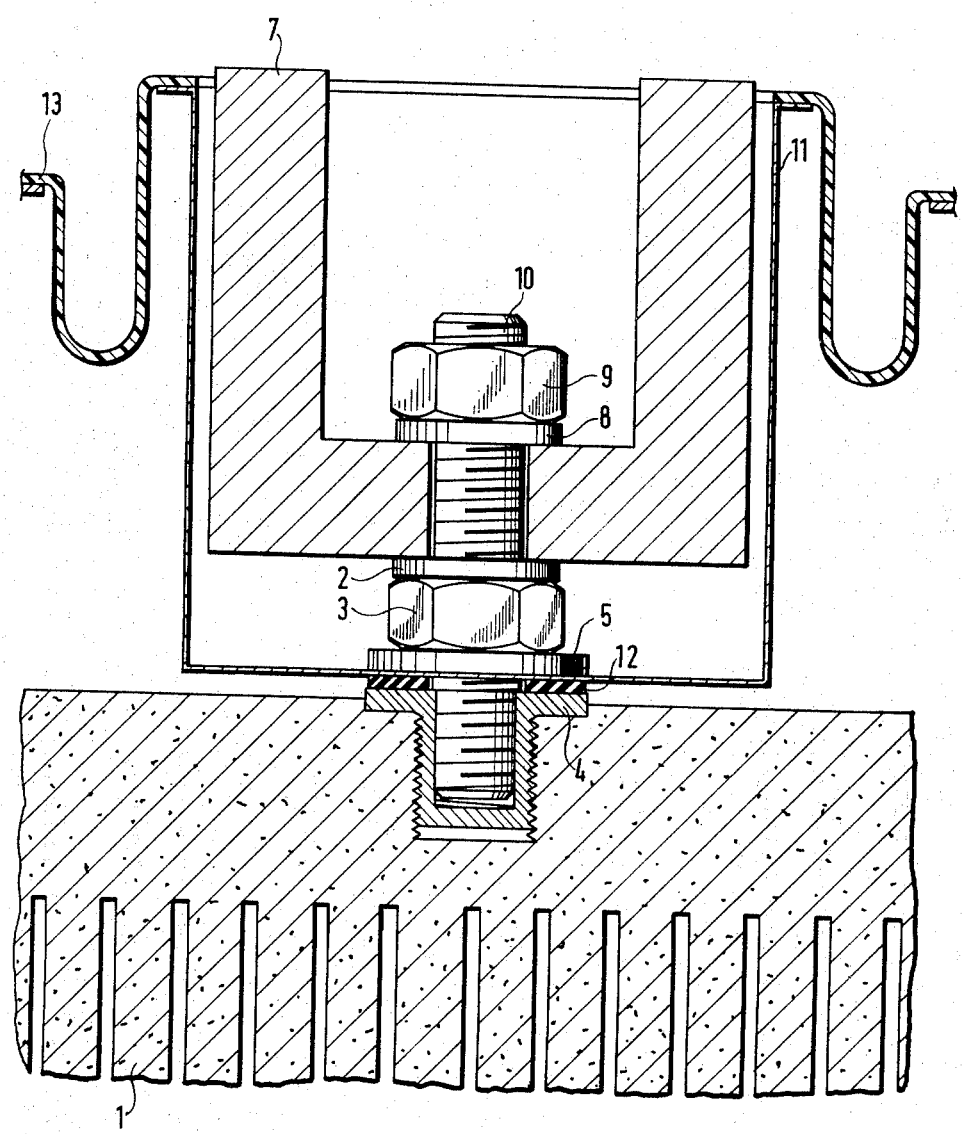
FIG. 4 represents a vertical section through still another connection of a graphite plate with a current distributing rail, in which the bellows is replaced by a trough of valve metal.

According to the arrangement of FIG. 4, the bellows has been replaced by a sheet metal trough 11 of valve metal such as titanium. Between the contact bushing 4 and the trough 11 there is provided a gasket 12 of chlorine and electrolyte-resistant elastomer. The seal of the chlorine bath relative to the atmosphere is effected by a sleeve 13 likewise of elastomeric material.

FIGS. 5 and 6 show that the anode according to the present invention is well suited for automatic adjustment. To this end, the arrangement of FIGS. 5 and 6 each comprise a flexible current conductor 14, a current rail 15, an adjusting device 16, a rigid cell cover 17, a cover edge foil 18, a floating cover 19, and an anode support 20.

The thinness of the graphite plate is naturally limited by the diameter of the contact bushings. For reasons of strength and corrosion-resistance it is advantageous to have the graphite plates twice as thick as the lower diameter of the contact bushings. The minimum strength is around 30 millimeters. The thickness above this lower limit up to approximately 75 millimeters yields the most advantages. It is not advisable to employ thicker plates because by such thicker plates the withdrawal of chlorine gas bubbles is unnecessarily impeded with the result that the cell voltage increases.

In contrast to the stamp-shaped graphite anode which is always dimensioned relatively large—the presently customary cross sections of modern horizontal plates vary from 600 to 400 square centimeters—the cross section of the graphite plate according to the present invention is small. In this connection, it should be noted that if the graphite plate has a height of 200 millimeters—an anode construction composed of such high graphite plates, would be laid out for a running period of more than two years— the cross-sectional surface would still be below 150 square centimeters. For the manufacturing process and the quality of the graphite anode plates, which are always produced by extrusion pressing, this is of foremost importance because as experience has shown, the smaller cross sections can be qualitatively more favorable and with finer grains and homogeneous manner be produced than the large cross sections. In addition thereto, a graphite plate which has a small cross section contains proportionally more of the particularly wear-resistant outer pressed skin. This clearly indicates why the optimum as well as the technically possible lifetime of the anode according to the present invention is higher than that of the heretofore known stamp-shaped anodes. Without having to fear the energy drawbacks of a stamp-shaped graphite anode dimensioned too thick, thus the height of the graphite plates according to the invention will be considerably above 150 millimeters, preferably at 175 millimeters. A greater voltage loss in the interior of the plates is, nevertheless, not encountered because the new anode construction takes into consideration the direction dependency of the specific electric conductivity within the extrusion-pressed graphite and does so in a better manner than the heretofore customary anode construction.

In contrast to the relatively heavy stamp anode, with the anode according to the invention, the number of the slots can be considerably increased. The graphite anode according to the invention, which on an average is from two to three times as light and simultaneously can be handled easier, has a considerably lower transport sensitivity. The web or tooth width of the graphite plate according to the invention may thus better be adapted to the respective anode current intensity. The greater height of the plate further more permits the mounting of deeper slots. It is obvious that as a result thereof the chronological voltage course of the electrolyte cell will be favorably influenced.

The flange of the contact bushing which rests on the non-slotted top side of the plate corresponds as to its diameter to the thickness of the graphite plate. A previous smoothing of the circular graphite region therebelow reduces the contact resistance of the screw connection.

The multiple contacting of each graphite plate—within each current half meter a contact is supposed to be located—will increase the assurance that the current is uniformly distributed and will bring about a saving in voltage.

The width of the spacing between the plates is to be adapted to the respective anode current intensity. A gap width of three millimeters between graphite plates having a thickness of 50 millimeters corresponds to the specific bore cross section of the 6 millimeter diameter gas withdrawal openings of a horizontal plate with a bore picture of 15.5 x 27 millimeters.

In view of the fact that the comb-like graphite plates are arranged transverse to the direction of flow of the cathode and of the electrolyte, a trouble-free withdrawal of the brine—chlorine gas mixture from the plate bottom side and from the slots will be aided.

The advantages of a multiple contacted comb-like graphite plate extending over the entire cathode width are manifested by a simple distance control, a uniform electrolyte flow and a uniform current distribution.

It is, of course, to be understood that the present invention is, by no means, limited to the particular showing in the drawings, but also comprises any modifications within the scope of the appended claims.

What is claimed is:

1. A horizontal electrolysis cell with mercury cathode means which has a direction of flow, and thin, vertically arranged, spaced graphite anode plates transverse to said direction flow, said plates having a plurality of slits from the under side upwardly so that each plate has a comb-like structure, each plate having contact sleeves of electrical conducting, corrosion-resistant material countersunk in the upper side, a plurality of electrically conductive studs secured in said sleeves, at least one electrical conducting current rail extending across the upper side of said plates, a channel-like trough of corrosion-resistant material in which said rail is positioned, said studs on said plates passing through said trough and the rail therein was fastening means on said studs clamping said rail and trough to said plates with the rail electrically connected to said studs, said trough being sealed against leakage around said sleeves and studs by clamping of said fastening means against said sleeves.

2. An electrolysis cell according to claim 1, characterized thereby that the contact sleeves consist of valve metal layered with platinum and at the upper unclosed end each provided a flange of which the diameter corresponds to the thickness of the graphite plates.

3. An electrolysis cell according to claim 2 characterized thereby that the contact sleeves consist of platinized titanium.

4. An electrolysis cell according to claim 1, characterized by a plurality of troughs and rails therein connected to said plates.

5. An electrolysis cell according to claim 4, characterized thereby that the troughs are embodied as folded bellow means of corrosion resistant elastomer, and are connected with cell cover parts consisting of the same elastomer.

6. An electrolysis cell according to claim 4, characterized thereby that the troughs consist of valve metal especially titanium and are connected with the parts of cell cover means whereby elastomer seals are arranged between the through and contact sleeves.

References Cited
UNITED STATES PATENTS

| | | | |
|---|---|---|---|
| 3,409,533 | 11/1968 | Murayama et al. | 204—219 |
| 908,545 | 1/1909 | Carrier, Jr. | 204—219 |
| 3,271,289 | 9/1966 | Messner | 204—290 F |
| 3,260,662 | 7/1966 | Henegar | 204—286 |
| 2,868,712 | 1/1959 | Oeprez | 204—288 |

F. C. EDMUNDSON, Primary Examiner

U.S. Cl. X.R.

204—119, 286, 288, 294